(12) United States Patent
Landau et al.

(10) Patent No.: US 7,897,538 B2
(45) Date of Patent: Mar. 1, 2011

(54) PROCESS FOR REMOVING SULFUR COMPOUNDS FROM HYDROCARBON STREAMS AND ADSORBENT USED IN THIS PROCESS

(75) Inventors: Miron Landau, Beer-Sheva (IL); Mordechay Herskowitz, Meitar (IL); Iehudit Reizner, Lehavim (IL); Zhiguo Hou, Fairfax, VA (US); James E. Kegerreis, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1384 days.

(21) Appl. No.: 10/851,371

(22) Filed: May 21, 2004

(65) Prior Publication Data

US 2005/0258077 A1    Nov. 24, 2005

(51) Int. Cl.
*B01J 20/00*    (2006.01)
(52) U.S. Cl. ..................................... 502/407; 502/439
(58) Field of Classification Search ................. 502/407, 502/411, 415, 439
See application file for complete search history.

(56) References Cited

U.S. PATENT DOCUMENTS

| 5,583,277 | A | 12/1996 | Kuehl |
| 5,795,559 | A | 8/1998 | Pinnavaia et al. |
| 6,534,441 | B1 * | 3/2003 | Bartley et al. ............... 502/337 |

* cited by examiner

*Primary Examiner*—Edward M Johnson

(57) ABSTRACT

The present invention is an adsorbent for removing sulfur from hydrocarbon streams. The adsorbent includes nickel particles distributed in a phase containing silica and alumina.

26 Claims, 4 Drawing Sheets

PROCESS FOR REMOVING SULFUR COMPOUNDS FROM HYDROCARBON STREAMS AND ADSORBENT USED IN THIS PROCESS

FIELD OF THE INVENTION

The present invention relates to a process for desulfurization of hydrocarbon streams, using a composite adsorbent which binds sulfur compounds and lowers sulfur content in said hydrocarbon to 1 ppm or less. The invention also provides a high capacity adsorbent for said process enabling quick and efficient desulfurization in batch and continuous mode.

BACKGROUND OF THE INVENTION

Petroleum products contain relatively high levels of sulfur, in the form of organic sulfides, organic disulfides, thiols, and aromatic compounds like thiophene, benzothiophene, etc. For more reasons, it is desirable to lower the amount of sulfur in said products. Sulfur poisons the catalysts that are used in reforming of crude hydrocarbons, or in catalytic converters of the car engine. Reducing the sulfur level in gasoline has further a beneficial effect in reducing the corrosion of the engine components. A strong incentive to lower the sulfur levels in fuels comes from environmental considerations. Sulfur oxide emissions from the car engines contribute to acid rains, whereas the poisoning of the catalytic converters by sulfur leads to increased emissions of nitrogen oxide, carbon monoxide and unburned hydrocarbons. The specification for diesel fuel is about 500 weight parts of sulfur per million weight parts of fuel (ppm). The US average gasoline has about 350 ppm sulfur. It is expected that the US and EU sulfur specification will be less than 50 ppm for gasoline after 2005. It is therefore desirable to achieve ultra-deep desulfurization of commercial fuels, even down to 1 ppm sulfur or less.

Petroleum hydrocarbon based liquids, such as gasoline, are one of the preferred fuel sources being considered for future Fuel Cell Vehicles (FCV's). Other fuel choices, such as methanol or hydrogen, require building new manufacturing and distribution infrastructure system, which will be very expensive. Utilizing gasoline takes advantage of the existing fuel distribution and retail infrastructure. However, with even state-of-the art fuel cell systems, sulfur at 1 ppm can be potentially poisoning to the fuel processor and the fuel cell stack, which would cause reduced fuel efficiency. An on-board sulfur trap, which is capable to remove sulfur to less than 1 ppm may be required to safe guide the operation of fuel processor and stack.

There are two key requirements for an on-board sulfur trap. The first one is the sulfur capacity of a given sulfur trap material. Higher capacity means a longer lifetime of the trap. For example, for a trap of 1.5-liter, a sulfur capacity of 0.5 g/cc % would run for about 5,000 miles before replacement on a 30 ppm sulfur gasoline. But, if the sulfur capacity is 2 g/cc %, the trap would last for more than 16,000 miles. Currently, no prior art has disclosed any materials that achieve a sulfur capacity of greater than 1.5 g/cc % for removing sulfur from 30-ppm sulfur pump gasoline to 1 ppm or less.

The second issue related to on-board application is the material reactivity. For a given fuel processor, it requires a certain fuel rate to meet its maximum power level. This requirement can be met by either increasing the amount of trap material (trap size increase) or using more reactive sulfur trap material. A highly reactive material provides a number of advantages for on-board applications. It reduces weight, volume, and is easier to handle.

The art discloses a number of processes for removing the sulfur compounds from hydrocarbon streams; the more practical of which comprise a nickel catalyst. U.S. Pat. No. 5,807,475 describes an adsorbent for desulfurization of gasoline based on nickel-exchanged zeolite. After 16 h of treatment, the sulfur content of naphtha decreased to 200 ppm. U.S. Pat. No 6,254,766 describes a sorbent comprising nickel deposited on an inorganic support obtained by mixing of zinc oxide, silica and alumina. Said sorbent lowers the sulfur content in gasoline from 310 ppm to 30 ppm at 350° C. in the presence of hydrogen.

Multi stage processes, using different catalysts and different conditions at each stage, reach lower levels of sulfur. U.S. Pat. No. 5,322,615 describes a method for removing sulfur from hydro-treated naphtha to ultra-deep desulfurization level of less than 0.02 ppm in three stages, comprising treatment with nickel, and treatment with hydrogen in the presence of platinum, while employing temperatures up to 450° C. and pressures up to 35 atm. U.S. Pat. No. 5,114,689 describes a three-stage process for ultra-deep desulfurization of naphtha to a level of less than 0.02 ppm, comprising treatment with 4% to 54% nickel dispersed in amorphous silica bound with alumina in the presence of hydrogen, treatment with 0.2% platinum on alumina in the presence of hydrogen, and treatment with potassium on alumina, employing temperatures 260-345° C. U.S. Pat. No. 5,106,484 describes a three-stage process for lowering the sulfur content in hydro-treated naphtha to 0.1 ppm, comprising treating said naphtha with nickel, and then with hydrogen in the presence of manganous oxide, employing temperatures 400-600° C. and pressures up to 20 atm. U.S. Pat. No. 4,634,515 describes a nickel catalyst, consisting of at least 50% elemental nickel dispersed in alumina, used in a three stage process including naphtha reforming, wherein 0.5 ppm of sulfur is reached in said naphtha. U.S. Pat. No. 4,925,549 describes a method for removing sulfur to less than 0.1 ppm in two stages, comprising treating with hydrogen in the presence of $Zn/Al_2O_3$ catalyst, and contacting with barium exchanged zeolite.

Tawara K. et al. [Sekiyu Gokkaishi 43 (2000) 114-120] describe a sorbent of nickel deposited on the support made of $ZnO$—$Al_2O_3$, allowing to remove the sulfur compounds from kerosene from a level of 62 ppm down to less than 1 ppm in one stage, while employing hydrogen treatment at a temperature of 325° C.

It appears that the state of art in desulfurization of hydrocarbon feedstocks does not allow to reach the sulfur level of 1 ppm or less in absence of hydrogen, and at temperatures lower than 250° C. It is therefore an object of the present invention to provide a new process for ultra-deep desulfurization of hydrocarbon streams.

It is an object of the present invention to provide a new process for desulfurization of hydrocarbon streams enabling to achieve the sulfur level of 1 ppm or less at temperatures lower than 250° C.

It is another object of the present invention to provide a process for ultra-deep desulfurization of hydrocarbon streams enabling to achieve the sulfur level of 1 ppm or less in absence of hydrogen.

It is still another object of the present invention to provide a new process for ultra-deep desulfurization of commercial fuels enabling to achieve The sulfur level of 1 ppm or less in one stage.

It is further an objective of this invention to provide a highly reactive adsorbent for desulfurization of hydrocarbon streams.

It is further an object of this invention to provide a high capacity adsorbent for desulfurization of hydrocarbon streams.

SUMMARY OF THE INVENTION

The present invention provides a composition, a method for making it, and a process for using it. The process for using it is a process for removing sulfur compounds from liquid hydrocarbon streams by using a high capacity adsorbent which is a composite material containing nickel particles distributed in a phase containing silica, alumina and promoting additives (copper or/and silver lithium, zinc), obtained by the reduction of a composite material consisting of nickel oxide (NiO), copper and/or silver oxide (CuO, $Ag_2O$, $Li_2O$, ZnO) wherein said composite is preferably formed by homogeneous deposition-precipitation of a nickel salt onto a mesoporous silica materials grafted with alumina species and deposition of promoting additives onto the NiO-alumina-silica composite. The process of desulfurization according to this invention is a one-stage process that is carried out at a temperature in the range from 150 to 250° C., and it does not require hydrogen atmosphere. The process can be carried out both in a batch mode and in a continuous mode.

The adsorbent, that can adsorb more than 1 g sulfur per 100 g, is also a part of the invention. The affinity of the adsorbent toward sulfur compounds enables deep desulfurization down to the levels 1 ppm or less.

DETAILED DESCRIPTION OF THE PREFERRED EMBODIMENTS

Figure 1:
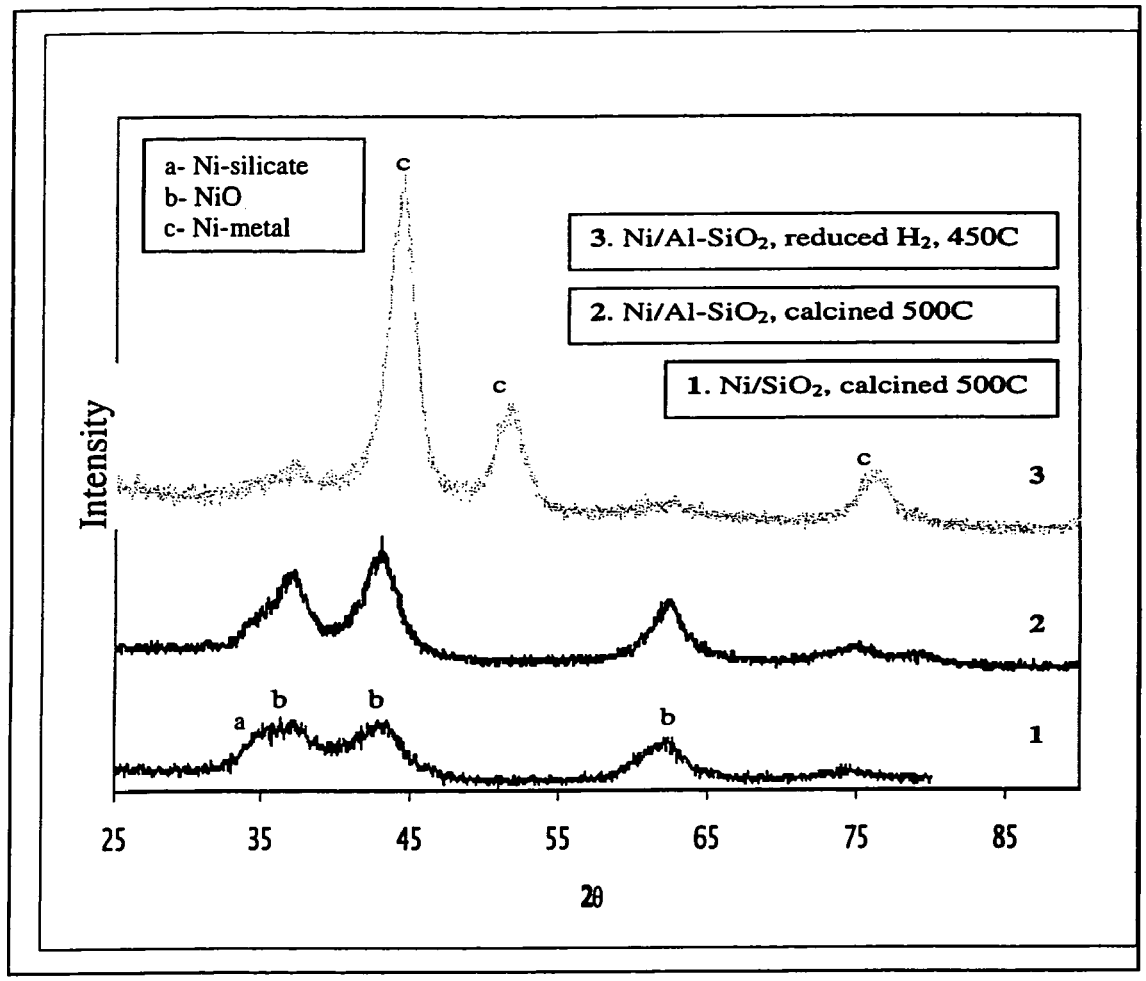
FIG. 1 shows the XRD data of the BGU material. Without alumina addition by grafting substantial mount of nickel exists in the form of Ni-silicate (peak "a"). Insertion of alumina yields about all the nickel in the form of Ni-oxide (NiO, peaks ("b"). After hydrogen reduction this yields a metallic Ni-phase with high dispersion—peaks "c", the peaks width corresponds to the crystal size 4.5 nm.

The present invention is a composite material, comprising nickel particles distributed in a phase containing silica, alumina and promoting additives (copper or/and silver, lithium, zinc) that displays high sulfur capacity in removing sulfur from hydrocarbon stream at relatively low temperatures, in absence of further liquid or gas additives. The alumina-silica/nickel composite is obtained by the reduction of a composite material consisting of nickel oxide (NiO), copper and/or silver oxide (CuO, $Ag_2O$, $Li_2O$, ZnO) wherein the composite is preferably formed by homogeneous deposition-precipitation of a nickel salt onto a mesoporous silica materials grafted with alumina species. Copper or silver, lithium, zinc promoting additives are included by deposition onto the NiO-alumina-silica composite.

An important feature of the composite material before the reduction step is a high surface area, namely at least 200 $m^2/g$, combined with high nickel content, namely at least 35 wt %. In order to reach these features the starting silica used for preparation of said composite material should have surface area 150-500 (250-350) $m^2/g$, pore volume 1-1.8 (1.2-1.5) $cm^3/g$ and average pore diameter 10-30 (15-25) nm. Grafting the surface of this silica with alumina species by treatment with aluminum alkoxide in organic solution followed by hydrolysis of adsorbed aluminum-containing species and final thermolysis protects nickel from formation of hydrosilicates at the deposition-precipitation step. This yields higher content of metallic nickel in reduced sorbent due to better reducibility of NiO relative to Ni-silicates. It allows also to carry out the reduction of Ni-precursor with hydrogen at lower temperature (<500° C.) that favors higher dispersion of metallic nickel phase. In such a way grafting of silica surface with 0.5-3.5 (1.5-2.5) wt % of $Al_2O_3$ increases the surface of metallic nickel in final sorbent composite that improves its sorption performance relative to organic sulfur compounds. The role of copper and silver additives is to stabilize the metallic nickel phase from sintering during the adsorption process at elevated temperatures.

The nanoparticles of nickel having size about 2 nm to 5 nm, and forming a part of said composite material after reduction, enable high sorption rate for sulfur compounds, at relatively low temperatures, and provide a capacity greater than 1 wt %, when expressed as weight ratio of adsorbed sulfur to said adsorbent. Said properties of the composite material allow to lower the sulfur content in treated gasoline to a level of less than 0.5 ppm sulfur, wherein the material can be used for long periods at high liquid hour space velocity (LHSV). The composite sorbent after reduction, comprising nickel and copper (silver) promoters deposited on alumina-silica, has the ability to react with organo-sulfur compounds and/or to adsorb them. Such irreversible interaction of sorbent and organo-sulfur compounds, that remain in gasoline after hydro-desulfurization treatment, provides ultra-deep removal of organo-sulfur compounds with no impact on the hydrocarbons consisting the main part of the gasoline.

The process of this invention for removing sulfur compounds from a liquid hydrocarbon stream comprises i) providing a composite material containing nickel particles distributed in a phase containing alumina, silica and copper (silver) promoters as an adsorbent for adsorption of sulfur compounds; and ii) contacting said stream with the adsorbent at a temperature in the range from 150 to 250° C. The process is carried out at a temperature preferably in the range 180° C. to 230° C., and it can be performed in a batch mode or in a continuous mode. When the process is continuous, the liquid hour space velocity is chosen as to reach the required level of sulfur residue. The LHSV is preferably in the range from 2 to 20 $h^{-1}$, preferably 6-15 $h^{-1}$. A preferred nickel content in the adsorbent that is used in the process of this invention is 55 wt % to 65 wt. %.

An adsorbent of this invention is a composite material containing nickel and Cu (silver, lithium, zinc) promoters deposited on alumina-silica, obtained by reducing nickel oxide alumina-silica matrix with hydrogen. The weight ratio of alumina/silica in the adsorbent is typically between 0.005 and 0.04. The adsorbent of the invention contains 35 wt % to 75 wt % nickel, preferably 50 wt % to 65 wt % nickel, in the form of nanoparticles, of a size typically from 3 to 4 nm, and has a capacity up to 2 g sulfur per 100 g adsorbent.

The composite material, useful in the ultra-deep desulfurization process of this invention, is preferably prepared by a method comprising i) providing an mesoporous silica material having the surface area 150-500 m$^2$/g; ii) grafting of $Al_2O_3$ on the silica material which contain 0.5 wt. % to 3.5 wt. % $Al_2O_3$, by mixing said silica with the aluminum alkoxide (aluminum tri-sec-butoxide or another Al-organic compound), in toluene suspension with an addition of triethylamine at molar composition of 1:41:7.3 respectively, at a temperature in the range from 80° C. to 85° C. for 6 hours followed by filtering the solid material thus obtained; iii) hydrolysis, the grafted solid material mixed with distilled water at molar ratio 1:3 respectively, in ethanol suspension at room temperature for 24 hours, filtering and washing the solid material thus obtained; iv) drying under vacuum the the grafted solid material at a temperature from 80° C. to 90° C. for 2 hours, and gradually at temperatures 250° C., 400° C., and calcination it in air at a temperature 500° C. for 6 hours; v) deposition-precipitating, in a homogeneous manner, nickel salt on the alumina-grafted silica material, by mixing it with the nickel salt and with urea in an aqueous suspension, wherein the initial pH is in the range from 0.5 to 2.5, at a temperature in the range from 65° C. to 98° C., for a time period necessary for pH to increase to a value in the range from 5.9 to 6.9, followed by filtering and washing the solid material thus obtained; vi) drying the solid material at a temperature from 65° C. to 98° C.; vii) addition of copper (and/or silver, lithium, zinc) oxide promoters by impregnation of dried nickel/alumina-silica composite with Cu- and-or Ag-salts solution, drying the solid material at a temperature from 65° C. to 98° C. followed by calcination it at a temperature from 450° C. to 550° C. for 2 to 6 hours, resulting in a composite material containing nickel oxide and copper (silver) oxide promoters distributed in alumina-silica matrix viii) reducing the composite material at 350° C. to 600° C. in a stream of hydrogen for 1 to 10 hours, providing nickel promoted with copper (and/or silver) deposited on alumina-grafted silica, which is a high capacity adsorbent for organosulfur compounds. The nickel salt is preferably nickel nitrate. The deposition-precipitation is preferably carried out in a stirred mixture containing about 10 to 14 wt % the alumina-grafted mesoporous silica, about 0.1 to 0.2 mol/l nickel nitrate, about 0.3 to 0.5 mol/l urea, and about 0.015 to 0.025 mol/l nitric acid. In a preferred embodiment, a mixture of 12 wt % alumina-grafted mesoporous silica, 0.15 mol/l nickel nitrate, about 0.4 mol/l urea, and 0.02 mol/l nitric acid is stirred at about 90° C., for 24 hours. The drying is preferably carried out for 24 hours at 90° C. The dried nickel/alumina-silica composite is impregnated by incipient wetness method with aqueous solution of copper (and/or silver, lithium, zinc) salts (nitrate, acetate, etc.) and the calcination after additional drying is preferably carried out for 4 hours at 500° C. Typically, the method provides an adsorbent with the surface area greater than 250 m$^2$/g. The reducing is carried out preferably at 350 to 600° C. for 4 to 6 hours, with gas hour space velocity being preferably 4000-8000 h$^{-1}$.

This invention thus relates also to the use of a sulfur adsorbent, which is a composite material containing nickel promoted with copper (and/or silver) deposited on alumina-grafted silica material and containing 35 wt % to 75 wt % nickel, for removing sulfur compounds from hydrocarbon streams, wherein the hydrocarbon can comprise a material chosen from treated naphtha, fuel feedstock, alkanes, alkenes and aromatic hydrocarbons, and the sulfur compound can comprise a material chosen from organic sulfides, organic disulfides, thiols, and aromatic compounds like thiophene, benzothiophene, and their derivatives.

EXAMPLE 1

Preparation of the Composite of Nickel on Grafted Silica Material

In 250 ml flask placed in a heating bath, provided by magnetic stirrer and condenser, 5 g of silica gel was placed with a mixture of two solutions 0.5 g aluminum tri-sec butoxide with 100 mL toluene, and 1.5 g triethylamine with 100 mL. The toluene suspension was vigorously stirred at 85° C. for 6 h, and then the solid was separated by filtration. The alumina-grafted mesoporous silica solid was suspended in 150 mL of ethanol solution containing 0.22 g of water and it was stirred at room temperature for 24 h. The alumina-grafted mesoporous silica solid then filtered and dried with vacuum at 85° C. for 2 h, followed by gradually at temperatures 250° C., 400° C., and then calcinated in air for 4 h at 500° C. The alumina-grafted mesoporous silica material exhibiting surface area of 243 m$^2$/g and a narrow mesopore size distribution, with the mean pore diameter of 5 nm and the pore volume of 0.3 cm$^3$/g. EDX analysis, performed by the instrument SEM Quanta 2000 Philips Fay Co., indicated the contents of Al, Si, and O to be 2.35, 50.32 and 47.35 wt %, respectively.

The alumina-grafted mesoporous silica material, 6.4 g, obtained in the previous step, was suspended in 50 ml of aqueous solution containing 0.14 mol/l of nickel nitrate (Ni$(NO_3)_2$*6$H_2O$), 0.42 mol/l of urea, and 0.02 mol/l of $HNO_3$, pH being 1.5. The mixture was stirred and heated at 90° C. for 24 h. During this period, the pH increased to 6.4. The mixture was quickly cooled to 20° C. on ice bath and filtered. The solid was washed on filter with 200 ml of distilled water, and transferred into a flask with 200 ml of distilled water, stirred for 15 min at 60° C. and filtered again. This washing procedure was repeated twice.

The washed material was dried in air at 90° C. for 24 h and calcinated at 500° C. for 4 h (the heating rate 5° C./min), which yielded 19.2 gram. EDX analysis, performed by the instrument SEM Quanta 2000 Philips Fay Co., indicated the contents of Ni, Si, Al and 0 to be 63.47, 21.19, 1.3 and 14.04 wt %, respectively. XRD patterns of the material, obtained by the difractometer Philips PW 1050/70, indicated the existence of one phase, nickel oxide, NiO, (peaks at 2θ=37.28°, 43.3°, 62.92°, 75.44°). The surface area of the composite material, as measured by BET method, was 304 m$^2$/g.

The above-obtained composite material was placed into a constainless steal reactor, having internal diameter 10 mm and length 100 mm, equipped with internal thermowell and heating rings. The temperature controller was used to maintain the temperature within ±1° C. The adsorbent reduced at 450° C. in the stream of hydrogen at GHSV (gas hour space velocity) of 12000 h$^{-1}$, for 8 h. Then the reactor was cooled down to the reaction temperature. The run was started by first increasing the pressure in the system with helium and pumping liquid at the preset value. The total pressure, 17 atm, was maintained constant by a back-pressure regulator.

The material, referred to a BGU-E, is characterized by the XRD data shown in FIG. 1. Without alumina addition by grafting substantial mount of nickel exists in the form of Ni-silicate (peak "a"). Insertion of alumina yields about all the nickel in the form of Ni-oxide (NiO, peaks "b"). After hydrogen reduction, this yields a metallic Ni-phase with high dispersion—peaks "c", width corresponds to the crystal size 4-5 nm.

EXAMPLE 2

Use of the Composite Sorbent in Desulfurization of Fuel

Figure 2:
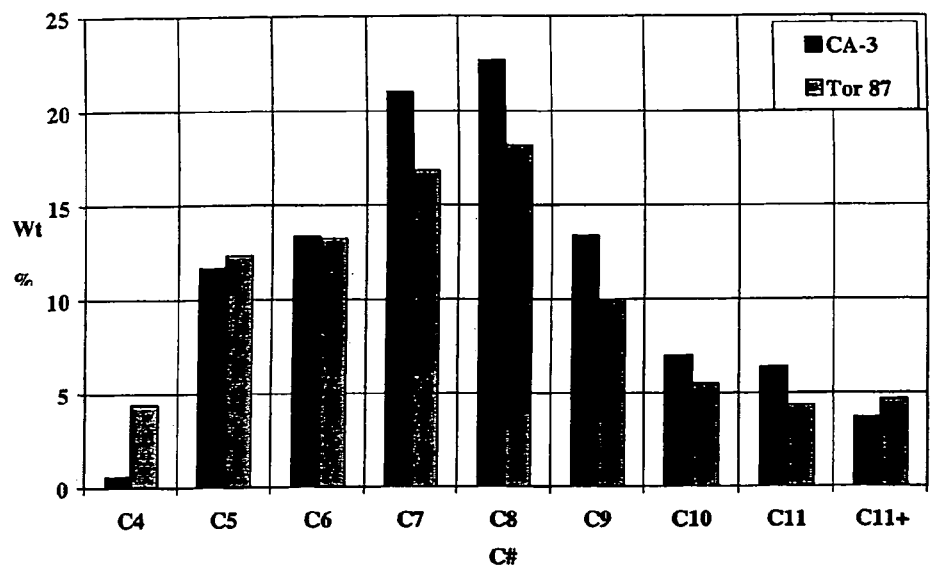
FIG. 2 shows a comparison of the carbon numbers of CA-3 with the CAL RFG Torrance 87.

The adsorbent prepared as described above, 1 g, was used for desulfurization of a gasoline (CA-3) that mimics California reformulated gasoline (CAL-RFG) containing 22 ppm total sulfur in continuous mode. This fuel, CA-3, is used throughout the test. Table 1 shows that CA-3 is similar to the marketed California Reformulated Gasoline (CAL-RFG) and prepared through blending of all the components of the CAL-RG except replacing 10 vol % MTBE by 3 vol % EtOH. FIG. 2 shows a comparison of the carbon numbers of CA-3 and CAL-RFG showing that they match very well. The adsorbent was placed into stainless steal reactor and reduced as describe above. The gasoline at room temperature was fed to the reactor heated at 230° C. and flowed gradually through it at LHSV 2 h$^{-1}$, 3 h$^{-1}$, 4 h$^{-1}$ into a cooler trap. Gasoline after the treatment was periodically analyzed by GC method as described above. The sulfur content decreased from 22 to 0.5 ppm and remains at this level for 110 h. The amount of sulfur adsorbed to the adsorbent, when expressed as weight per weight, was 1.3 wt %.

TABLE 1

|  | CA-3 | CAL Pump Gas 87 |
| --- | --- | --- |
| Paraffins | 44% | 41% |
| Olefins | 8% | 7% |
| Naphtheses | 23% | 15% |
| Aromatics | 22% | 26% |
| Sulfur | 22 ppm | 23 ppm |
| Nitrogen | 35 ppm | — |
| MTBE | 0% | 10% |
| Ethanol | 3% | N/A |

EXAMPLE 3

The procedure of the adsorbent preparation, as described in Example 1, was repeated exclusive of the grafting Al$_2$O$_3$ step. The nickel content of the sorbent was 65 wt. %, and the surface area before reduction with hydrogen was 302 m$^2$/g. XRD patterns of the material indicated the existence of two phases, Ni$_3$Si$_2$O$_5$(OH)$_4$ (peaks at 2θ=24.44°, 34.11°, 36.7°, 60.50°) and NiO (peaks at 2θ=37.28°, 43.3°, 62.92°, 75.44°), see FIG. 1. The adsorbent, 1 g, was loaded to a continuous reactor as was describe in Example 2. The adsorbent reduced at 550° C. in the stream of hydrogen at GHSV (gas hour space velocity) of 12000 h$^{-1}$, for 4 h. The desulfurization procedure of Example 1 was repeated with the adsorbent. Gasoline after the treatment was periodically analyzed by GC method as described in Example 2. The sulfur content decreased from 22 to 0.5 ppm and remains at this level for 100 h. The amount of sulfur adsorbed to the adsorbent, when expressed as weight per weight, was 0.7 wt %.

EXAMPLE 4

The procedure of the adsorbent preparation, as described in Example 1 was repeated with addition of copper oxide promoter by impregnation of dried nickel/alumina-silica composite with Cu salt solution, referred to as BGU-F. The Ni, Cu and Al content were 58 wt %, 8 wt % and 2.5, respectively. The surface area before reduction with hydrogen was 220 m$^2$/g. XRD patterns of the material indicated the existence of NiO phase (peaks at 2θ=37.28°, 43.3°, 62.92°, 75.44°). The desulfurization procedure of Example 1 was repeated with the adsorbent. Gasoline after the treatment was periodically analyzed by GC method as described in Example 1. The sulfur content decreased from 22 to 0.5 ppm and remains at this level for 150 h. The amount of sulfur adsorbed to the adsorbent, when expressed as weight per weight, was 1.8 wt %.

EXAMPLE 5

The procedure of the adsorbent preparation, as described in Example 1 was repeated with addition of copper oxide promoter by impregnation of dried nickel/alumina-silica composite with Ag salt solution. The Ni, Ag and Al content were 59 wt %, 7.8 wt % and 2.3, respectively. The surface area before reduction with hydrogen was 230 m$^2$/g. XRD patterns of the material indicated the existence of NiO phase (peaks at 2θ=37.28°, 43.3°, 62.92°, 75.44°). The desulfurization procedure of Example 1 was repeated with the adsorbent. Gasoline after the treatment was periodically analyzed by GC method as described in Example 1. The sulfur content decreased from 22 to 0.5 ppm and remains at this level for 150 h. The amount of sulfur adsorbed to the adsorbent, when expressed as weight per weight, was 1.7 wt %.

EXAMPLE 6

Figure 3:
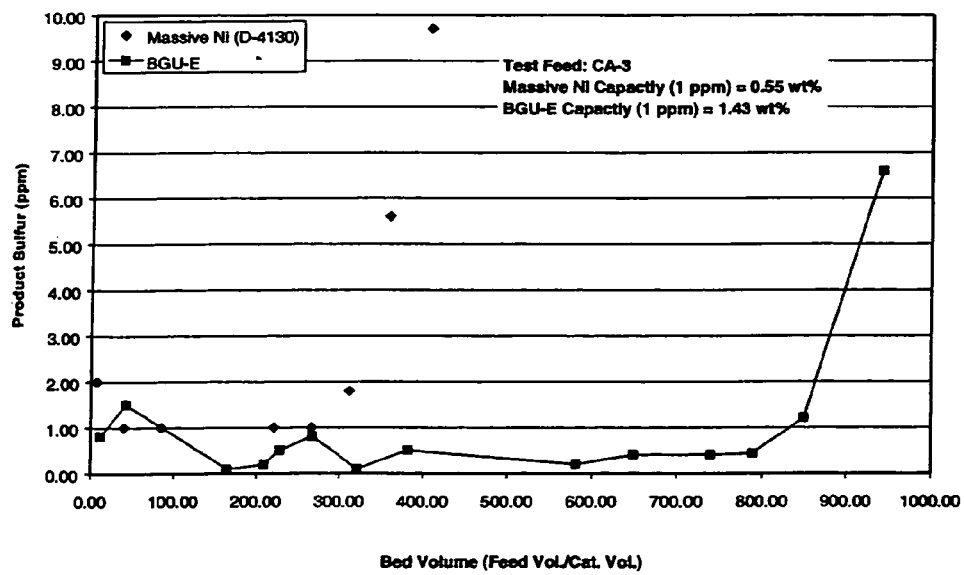
FIG. 3 shows a comparison between BGU-E with massive Ni, a commercial sulfur adsorbent marketed by Engelhard.

A comparison was made between the sorbent of Example 1, BGU-E, and massive Ni, a commercial sulfur absorbent sold by Englehard for sulfur removal from the gasoline of Example 1, CA-3. The results are shown in FIG. 3, where the Bed Volume, or the Cumulative Gasoline Treated (in FIG. 4), is defined as the total volume of the feed (gasoline) treated per volume of the adsorbent. The bed volume up to the point where the sulfur content in the effluent fuel exceeded 1 ppm with a commercial massive nickel adsorbent achieved about 200 corresponding to the sulfur capacity of this material 0.55 wt. %. With BGU-E adsorbent prepared according to Example 1, the bed volume (S$_{out}$<1 ppm) reached ~850 corresponding to the sulfur capacity of 1.43 wt. %. So, the sorbent prepared according to Example 1 of this invention has about 3 times higher sulfur capacity compared with commercial sorbent.

Information on Massive Ni

The massive Ni material used in this invention is manufactured and marketed by Engelhard. The specific batch is labeled as D4130E. The following table provides summary of the material:

| | |
| --- | --- |
| Surface area, m2/g | 150-200 |
| Ni content, wt % | 45-50 |
| Ni crystallite size, A | 160 max |
| Pore volume, cc/g | 0.4-0.55 |
| Packed ABD, g/ml | 0.75-0.9 |

The massive material extrudates (0.8-1.0 mm diameter) was first crushed and sieved to particles with an average size of 20 microns before charged into reactor. Once charged in the reactor, an Engelhard recommended procedure was carried out to activate the material. It was then subjected to the hydrocarbon stream for sulfur removal test.

EXAMPLE 7

Figure 4:
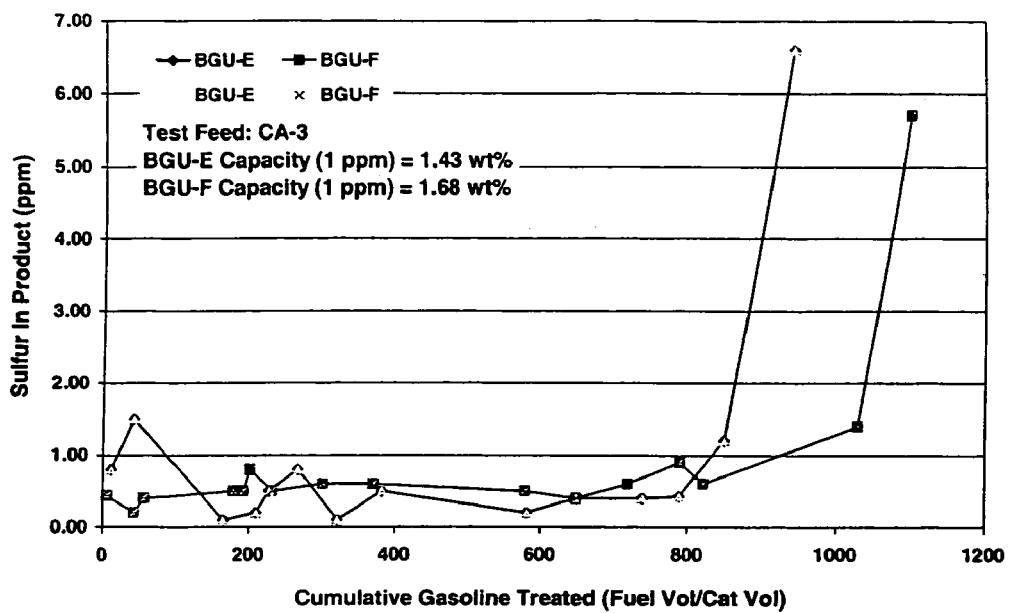
FIG. 4 shows that the sorbent with Cu promoter (BGU-F) has a sulfur capacity about 20% greater than BGU-E, which doesn't contain the additive.

A sorbent, including a copper promoter, was prepared according to Example 4 (BGU-F). This sorbent, BGU-F, was compared with the sorbent (BGU-E) of Example 1 without the additive. The sorbent with copper promoter, BGU-F, has a sulfur capacity about 20% greater than the sorbent, BGU-E, without the promoter. The results of the comparison are shown in FIG. 4. The bed volume up to the point where the sulfur content in the effluent fuel exceeded 1 ppm with a BGU-F adsorbent prepared according to Example 4 ($S_{out}<1$ ppm) reached ~1000 corresponding to sulfur capacity of 1.68 wt. %.

EXAMPLE 8

Figure 5:
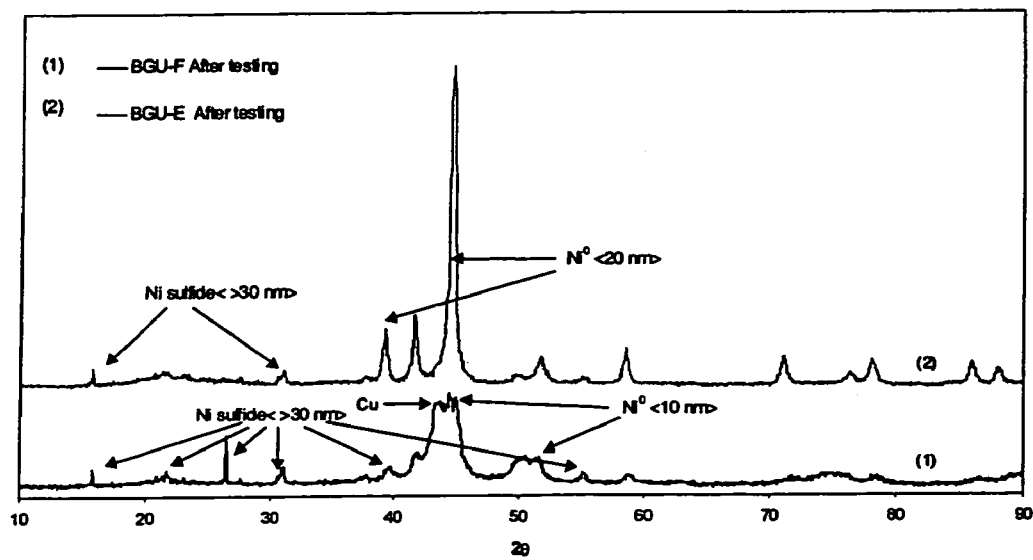
FIG. 5 shows a XRD comparison of spent BGU-E (w/o promoter) and BGU-F (with promoter) which clearly demonstrates that Cu promotion significantly reduces nickel sintering.
Figure 6:
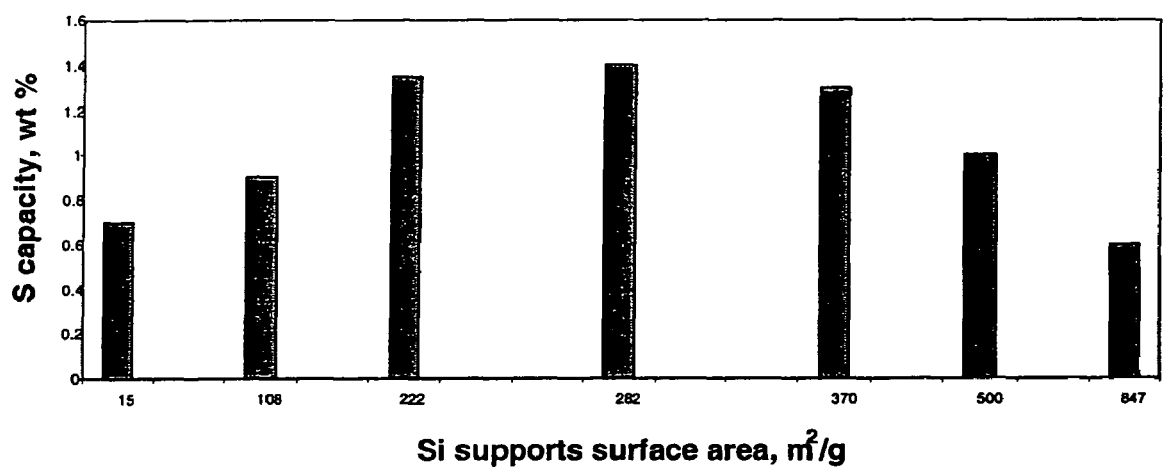
FIG. 6 shows a relationship between the surface area of the parent mesoporous silica and the sulfur capacity of the corresponding adsorbents.

The addition of a promoter to the sorbent reduces the nickel sintering. A comparison between the spent sorbent without a promoter, BGU-3, to the spent sorbent with the promoter, BGU-F, is shown in FIG. 5. The average nickel particle size of spent BGU-E is about 20 nm, and that of spent BGU-F is only about 10 nm. Since BGU-E and BGU-F have similar nickel particle size (5 nm) when they are freshly reduced, apparently nickel sintering of BGU-F during the sulfur removing process was substantially reduced as compared with BGU-E. These results show that a copper promoter significantly reduces nickel sintering.

EXAMPLE 9

The procedure of the adsorbent preparation, as described in Example 1 was repeated with addition of lithium oxide promoter by impregnation of dried nickel/alumina-silica composite with Li salt solution. The Ni, Li and Al content were 64 wt. %, 0.5 wt. % and 2.6 wt. %, respectively. The surface area before reduction with hydrogen was 294 m²/g. XRD patterns indicated the existence of NiO phase peaks at 2θ=37.28, 43.3, 62.92, 75.44°). The desulfurization procedure of Example 2 was repeated with this sorbent demoted BGU-N at gasoline LHSV 16 h⁻¹. The sulfur content decreased from 22 to 0.6-0.7 ppm and remained at this level for 80 h. The amount of sulfur adsorbed to the adsorbent, when expressed as weight per weight was 2.1 wt. %. Analysis of spent sorbent showed that it contained two times less carbon deposits relative to the BGU-E material.

What is claimed is:

1. A composition comprising nickel particles distributed in an alumina phase grafted onto mesoporous silica, which mesoporous silica has a surface area from about 150 to 500 m²/g; wherein the nickel particles in the form of a metallic nickel phase formed by the homogeneous deposition-precipitation of a nickel salt onto said mesoporous silica, material graphted with an alumina phase followed by a calcination step then a reduction step, wherein said alumina phase comprises between 0.5 to 3.5 wt. %.

2. The composition of claim 1 wherein said composition further comprises a Group IA or Group 1B metal or combinations thereof.

3. The composition of claim 2 wherein said metal is lithium, potassium, or sodium, copper or silver or combinations thereof.

4. The composition of claim 3 wherein said metal is silver and/or copper.

5. The composition of claim 4 wherein said nickel particles comprise 35 wt. % to 75 wt % of said composition.

6. The composition of claim 5 wherein said nickel particles comprise 50 wt. % to 65 wt. % of said composition.

7. The composition of claim 4 wherein said composition has a surface of least 200 m2/g.

8. The composition of claim 1 wherein said mesoporous has a surface of 250 to 350 m²/g.

9. The composition of claim 8 wherein said mesoporous silica has a surface area of about 280 m²/g.

10. The composition of claim 1 wherein said mesoporous silica has a pore volume between 1 and 1.8 cm³/g.

11. The composition of claim 10 wherein said. mesoporous silica has a pore volume between 1.2 and 1.5 cm³/g.

12. The composition of claim 1 wherein said mesoporous silica has an average pore diameter between 10 and 30 nm.

13. The composition of claim 12 wherein said mesoporous silica has an average pore diameter between 15 and 25 nm.

14. The composition of claim 1 wherein said alumina comprises between 1.5 and 2.5 wt. %.

15. A method for making sorbent a nickel, silica and alumina sorbent composition comprising grafting alumina onto a mesoporous silica support to form an alumina-silica solid and distributing a metallic nickel phase onto said support by the homogeneous deposition-precipitation of a nickel salt onto said mesoporous silica material graphted with an alumina phase followed by a calcination step then a reduction step.

16. The method of claim 15 wherein said grafting step is carried out by combining silica and an aluminum alkoxide in an organic solution.

17. The method of claim 16 where said aluminum alkoxide is aluminum 2-butoxide (aluminum tri-sec butoxide).

18. The method of claim 16 wherein said organic solution is tuluene and triethylamine.

19. The method of claim 16 further comprising the step of removing said alumina-silica solid from said organic solution and drying said solid.

20. The method of claim 15 wherein said step of distributing a nickel containing compound is carried out by combining nickel nitrate with said alumina-silica solid in aqueous solution containing urea to distribute nickel oxide and nickel silicate onto said support.

21. The method of claim 20 wherein said distributing step includes heating so as to minimize said distribution of nickel silicate on said support.

22. The method of claim 21 further comprising reducing said nickel containing compound to nickel particles.

23. The method of claim 15 furtther comprising the step of impregnating said support with an oxide promoter selected from the group consisting of lithium oxide, potassium oxide, copper oxide, and silver oxide and combinations thereof 24. The method of claim 21 further comprising the step of reducing said nickel oxide and said oxide promoter.

25. The method of claim 24 wherein said reduction is carried out within a temperature range of 350° C. to 600° C. for a time between 1 and 10 hours.

26. The method of claim 25 wherein said temperature range is 400° C. to 550° C.

* * * * *